March 19, 1946.   J. A. BROADSTON ET AL   2,396,984
HYDRAULIC SYSTEM
Filed Aug. 2, 1944
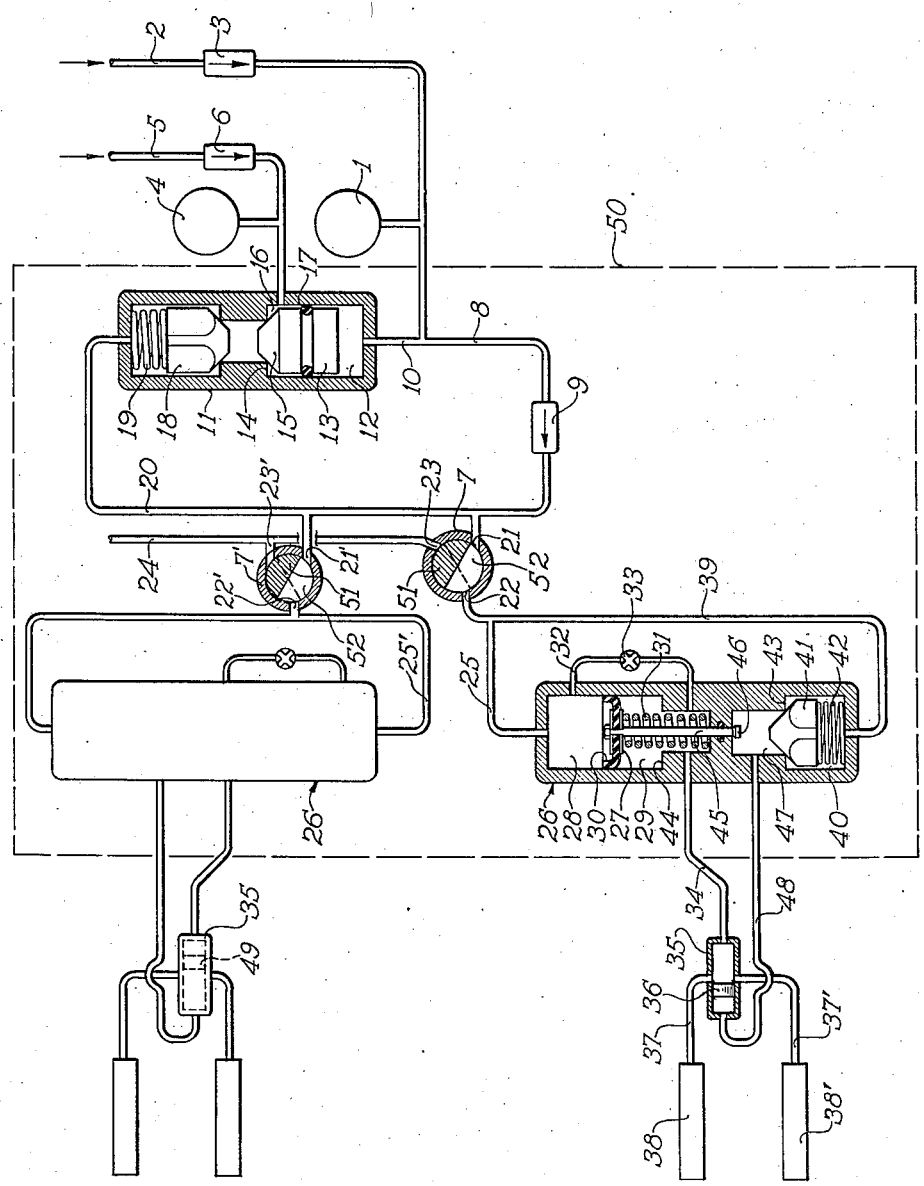
INVENTORS
James A. Broadston and Robert B. Sprague
BY
Attorney.

Patented Mar. 19, 194\_

2,396,984

UNITED STATES PATENT OFFICE 2,396,984

HYDRAULIC SYSTEM

James A. Broadston, Hollywood, and Robert B. Sprague, Long Beach, Calif., assignors to North American Aviation, Inc.

Application August 2, 1944, Serial No. 547,802

2 Claims. (Cl. 60—52)

The present invention relates to improvements in hydraulic systems and is specifically directed to a reduction in vulnerability of such systems in military aircraft.

It is an object of the invention to provide a revised circuit for hydraulic brakes or other similar systems wherein automatic pressure controlled flow transfer valves attach directly to a conventional type control valve whereby the flow of fluid under pressure is automatically transferred to an alternate line in the event of damage.

It is a further object of the invention to provide, for example, a brake system in aircraft, operable even under the following conditions: (1) right or left hand normal brake lines out; (2) right or left hand emergency lines to brakes out; (3) right hand normal and left hand emergency lines to brakes out, or vice versa. Damage to any of the foregoing lines, putting them out of service or rendering them inoperable would not preclude the possibility of still providing for the operation of the brake units.

A still further object of the invention is to provide a system operable even in the event of the following additional possible damage: (1) normal power supply and lines out; (2) either or both normal or emergency lines to brakes out, or one or either on either side; (3) emergency accumulator and lines out and either or both normal or emergency lines to brakes out. This further safeguards the system by providing an available source of power through either a normal or an emergency accumulator which would serve to operate the valves despite additional damage to the system at one or more points as above outlined, and which may be available even in the event of complete engine failure since the stored energy of the accumulator could be expected to be more than sufficient for the complete braking operation.

It is a still further object of the present invention to provide a hydraulic system particularly suitable for the operation of brakes on military aircraft, wherein the vulnerability of the system, as for example, to gunfire, is materially reduced. This system provides a series of alternate lines and means automatically transferring the flow of fluid under pressure to whichever portion of the circuit remains in operable condition, and it may readily be so arranged as to provide a compact installation wherein the control valve and the automatic transfer valves may be protected by armor plate against possible damage.

Additional advantages beyond the foregoing will be apparent to persons skilled in the art to which the present invention relates.

The drawing shows a schematic diagram of a brake circuit embodying the invention.

While the invention is equally adaptable to various types of hydraulic circuits such as, for example, a hydraulic system for operating the control surfaces of an airplane, we have chosen for the purpose of illustration an embodiment of the invention comprising an improvement in an airplane hydraulic brake system of the type which embodies an accumulator 1 holding fluid under pressure which is supplied through a line 2 and check valve 3 from an engine-driven pump or other power source. Such a system would normally direct the fluid through operator-controlled valves 7 and 7' and the lines 34 or 48 to the brake assemblies 38. Such a system may also incorporate an emergency accumulator 4 connected by an emergency line through the same valve 7 to the brake assemblies. Shooting out of one of the lines in such a normal system would leave only the other line for further operation.

The invention provides a changeover mechanism including valves 11 and 26 which, together with the usual control valve 7 may be incorporated in an armored casing which is indicated schematically at 50 and located at some well-protected point within the airplane and connected into the two lines leading from the normal and emergency accumulators respectively to the brakes so as to provide substantially twice as many possible paths for fluid flow as those provided in the normal system. The emergency accumulator 4 is supplied with fluid under pressure through line 5 and check valve 6 from an engine-driven pump which may be the same one that supplies the line 2 of the accumulator 1. Fluid under pressure from the normal accumulator 1 is fed to the brake control valve 7 through line 8 and check valve 9. This pressure is also admitted at 10 to an automatic pressure controlled flow transfer valve 11. Pressure in chamber 12 moves the piston 13 into contact with the seat 14, the tapered portion 15 of the piston forming a seal. Pressure from the emergency accumulator 4 entering the flow transfer valve 11 at 16 is held by the seated piston. An annular seal ring 17 is provided on the piston.

As long as the normal accumulator 1 is under pressure and the piston 13 in the flow transfer valve remains seated, fluid under pressure from the emergency accumulator 4 may not enter the system. If the pressure in the normal accumulator is removed, the piston 13 will no longer be held in seated position and the pressure at 16 will force the piston back allowing fluid to unseat the upper check valve 18 against the spring 19. Fluid under pressure from the emergency accumulator then is supplied to the brake valve 7 through line 20. The check valve 9 prevents the fluid entering the normal accumulator system.

The brake control valves as indicated at 7 and 7' provide a means for directing fluid entering port 21 and 21' to the outlet ports 22—22' which connect with the right hand and left hand brakes respectively. Means are also provided within the valve for connecting the port 23 and 23' to the brake supply ports 22—22' to permit the return flow of the fluid through the line 24 to a supply reservoir.

Fluid under pressure from either the normal or emergency accumulator is supplied through the brake control valves to corresponding systems for either or both the right and left hand brakes. Pressure from the port 22 is admitted through the line 25 to a flow transfer valve or hydraulic fuse 26. The fuse has a piston 27 so arranged as to provide a pair of chambers 28 and 29 on opposite sides thereof. The piston is provided with sealing means 30 and is maintained in normal mid-position by the spring 31. A by-pass line 32 and a manually controllable valve 33 provide means for filling the chamber 29 behind the piston with fluid. This operation is necessary only in the event of loss of fluid.

Fluid under pressure admitted to the chamber 28 tends to move the piston against the pressure of the spring 31, causing a displacement of the fluid in the chamber 29 in a ratio corresponding to the fluid admitted from the brake control valve. The fluid displaced from the chamber 29 is delivered through a line 34 to a shuttle valve 35, the piston of which will be acted upon to so position itself (as at 36) as to permit the delivery of fluid pressure through the lines 37—37' to the inboard and outboard brakes 38—38'.

In the event of loss of pressure as would be occasioned by damage to the line 34 between the flow transfer valve 26 and the shuttle valve 35, which latter would preferably be located in the immediate vicinity of the braking units, the fluid pressure from the brake control valve would be then transferred to an alternate set of lines. The line 39 connecting with the chamber 40 in the lower end of the flow transfer valve supplies fluid under pressure behind the piston 41 which is lightly loaded by the spring 42 and bears against the seat 43 normally forming a pressure-tight seal at this point. A loss of pressure in the normal circuit would result in the flow transfer valve piston 27 being forced entirely down, seating against the shoulder 44 and preventing the loss of additional fluid from the circuit beyond the amount displaced from the chamber 29. The piston 27 has a stem 45 depending therefrom, the tip 46 of which engages the lower piston 41, unseating it and allowing fluid to enter the chamber 47 from which it is directed through the line 48 into the shuttle valve. This latter valve, upon readjusting itself, as indicated at 49, will permit the proper delivery of fluid through lines 37 and 37' to the brake units 38 and 38'.

While the valve stem in a brake system of an airplane may be of a special type incorporating means for transferring the "feel" of the braking resistance back to the operator controlled pedal, for the purpose of the present invention any type of three-way or four-way valve may be employed. Accordingly, for the purpose of illustration, we have shown simple three-way valves in which a rotatable valve element 51 has a recess 52 adapted, in one position, to connect (through port 21), the line 8 to both of the parallel lines 25 and 25' (through ports 22 and 22'), and, in another position, to connect (through port 23), the return line 24 to both of the lines 25 and 25'.

The foregoing may be taken as illustrative of one form in which the invention may be embodied, it being our intention to cover in our claims the use of any equivalent arrangement or apparatus.

We claim as our invention:

1. In combination with a source of fluid under pressure, a pair of supply lines for delivering fluid therefrom, and a hydraulic device to receive said fluid; a flow transfer valve comprising a valve casing having two chambers therein joined by a connecting passage, the respective ends of which are defined by valve seats, a fluid responsive valve poppet in one of said chambers, one of said supply lines communicating with said one chamber at a point where the fluid it delivers will tend to move the valve poppet away from its seat and the other of said delivery lines communicating with said one chamber at a point where it may deliver fluid under pressure to move said valve poppet against its seat, a check valve poppet in the other chamber and means yieldingly urging said check valve poppet normally into engagement with its seat, and fluid lines respectively connecting the remote regions of said chambers with said hydraulic device.

2. In a hydraulic system, in combination with a source of fluid under pressure and a device to be operated thereby, a pair of fluid transfer lines leading to said device, and a flow transfer valve interposed between said source of pressure and said fluid lines and responsive to a reduction in pressure in one of said lines for closing off said line and opening the other line to the flow of fluid, said flow transfer valve comprising a valve casing having two valve chambers each adapted to receive fluid from said source, a spring-retracted piston in one of said chambers having a stem extending into the other chamber, a valve element in said other chamber normally seated under pressure from said fluid source so as to shut off communication between said source and one of said fluid lines, said piston dividing said one chamber into two regions, means providing a passage for fluid from one of said regions to the other, a valve closure for said passage the other fluid line communicating with said other region, said last means providing a balanced fluid pressure on both sides of said piston in normal operation which becomes unbalanced when pressure is reduced in the last-mentioned fluid line so that said piston will force said stem into contact with said valve element to unseat the same and provide an alternate path for the flow of fluid to said hydraulic device, and another valve means for controlling flow through the alternate paths to the hydraulic device.

JAMES A. BROADSTON.
ROBERT B. SPRAGUE.